Patented July 28, 1931

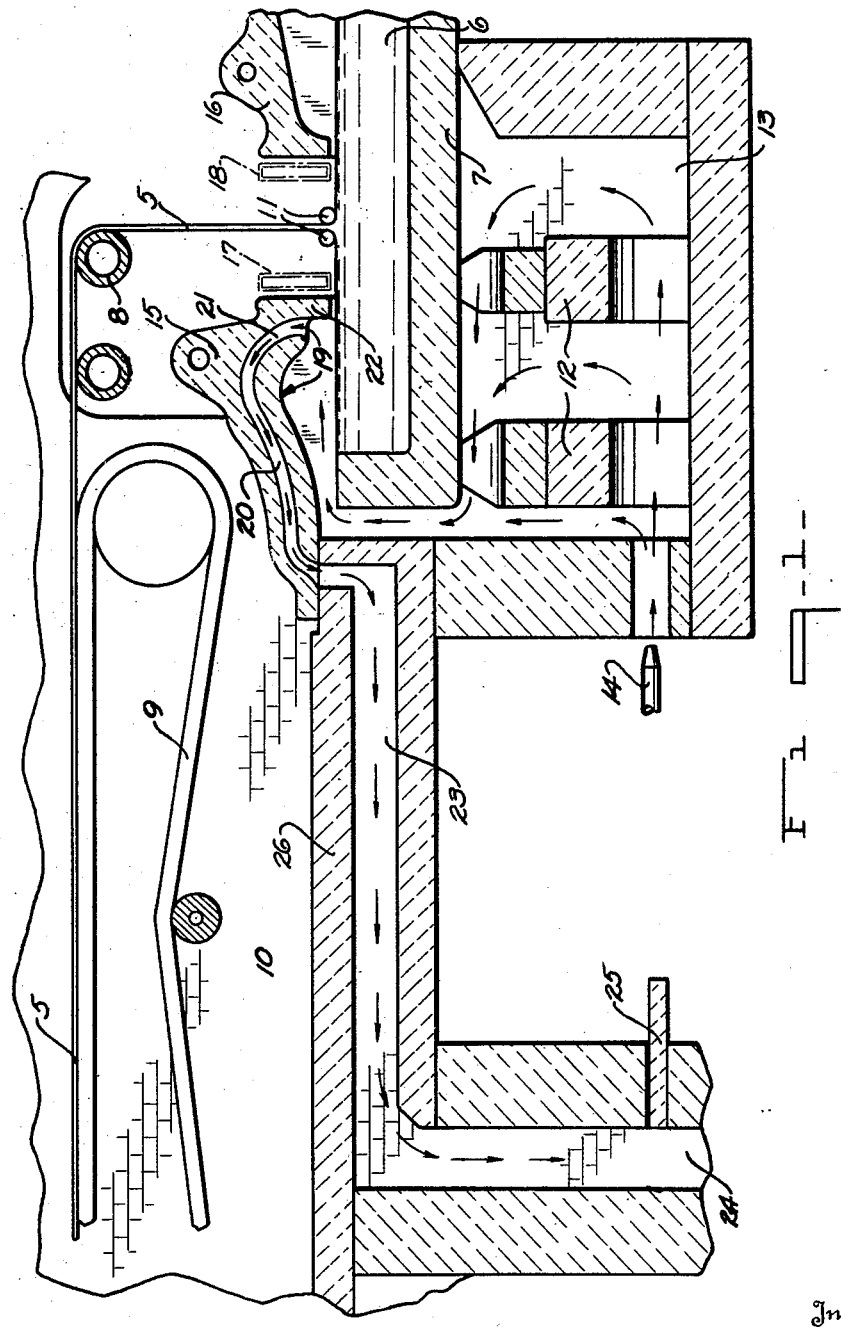

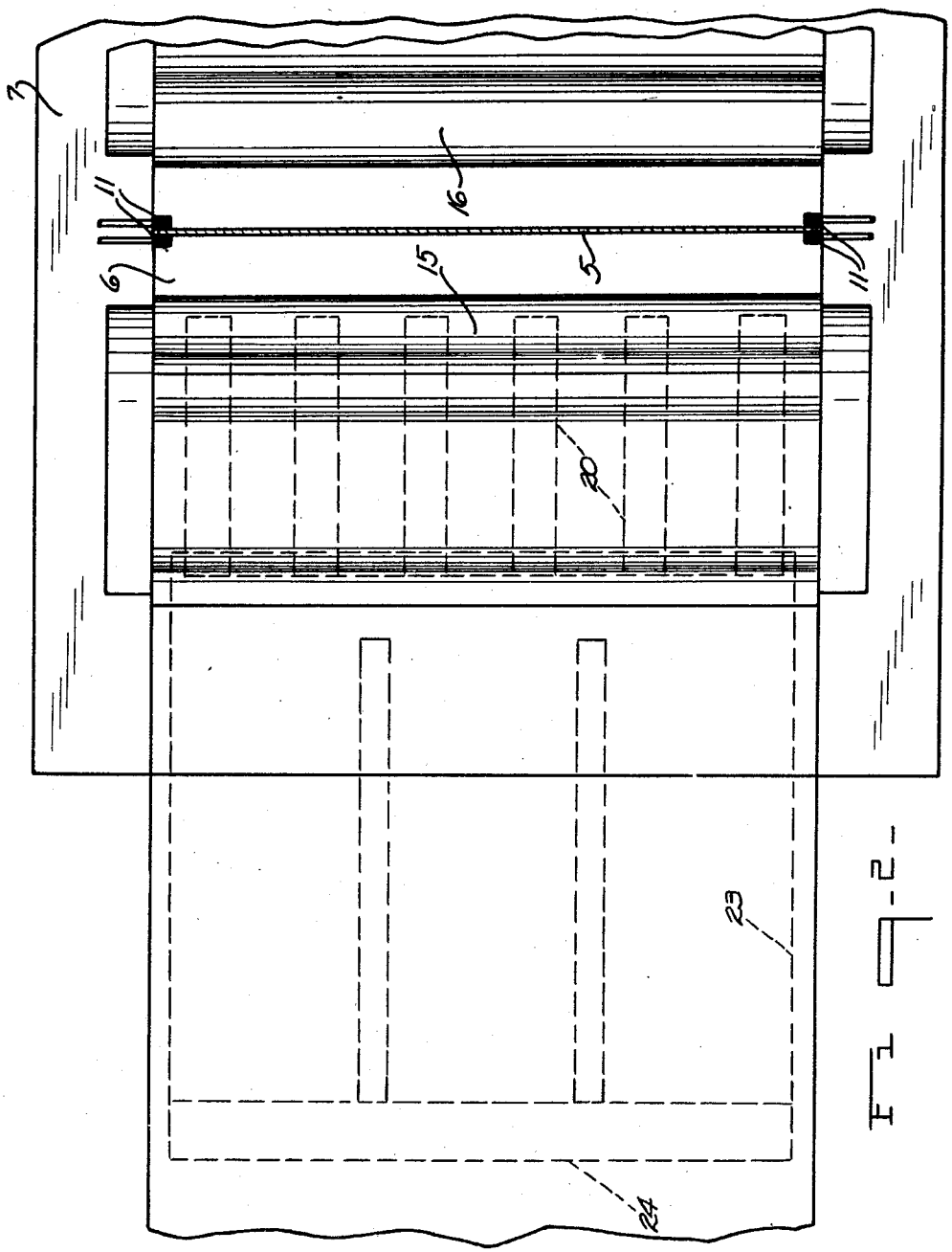

1,816,040

UNITED STATES PATENT OFFICE

JOSEPH P. CROWLEY, OF TOLEDO, OHIO, ASSIGNOR TO LIBBEY-OWENS-FORD GLASS COMPANY, OF TOLEDO, OHIO, A CORPORATION OF OHIO

SHEET GLASS DRAWING APPARATUS

Application filed May 31, 1928. Serial No. 281,741.

The present invention relates generally to sheet glass drawing apparatus and more particularly to the provision of an improved lip tile construction.

An important object of the invention is to provide in sheet glass apparatus, a lip tile of improved design which will serve to effectively protect the sheet being drawn from heat currents and radiated heat and also provide for a more accurate control of the heat beneath said lip tile whereby to render possible the drawing of a sheet of improved quality.

Another object of the invention is the provision of means for positively removing heat and gases from near the surface of the molten glass from which the sheet is drawn in a manner to prevent the same from coming in contact with and injuring the sheet.

A further object of the invention is the provision of improved means for regulating the heat beneath the lip tile and for withdrawing excessive heat therefrom, whereby to render possible a more accurate control of the temperature of the molten glass.

Other objects and advantages of the invention will become more apparent during the course of the following description when taken in connection with the accompanying drawings.

In the drawings forming a part of this application and wherein like numerals are employed to designate like parts throughout the same.

Fig. 1 is a vertical longitudinal section through apparatus constructed in accordance with the present invention, and Fig. 2 is a top plan view thereof.

In accordance with the Colburn system for drawing sheet glass as disclosed in the patent to I. W. Colburn 1,248,809 granted Dec. 4, 1917, a sheet of glass is drawn upwardly from a mass of molten glass contained in a relatively shallow receptacle or draw pot. In the Colburn machine there are also employed lip tiles positioned above the molten glass at opposite sides of the sheet to protect the sheet in its vertical run from heat currents and radiated heat which would otherwise strike the sheet. These lip tiles are also shaped to deflect heat and gases downwardly upon the surface of the molten glass to aid in the proper conditioning thereof. Heat absorbing shields or coolers are also usually arranged above the molten glass between the sheet and lip tiles to cooperate with said lip tiles in shielding the sheet from the heat and gases. However, it has been found that the arrangement ordinarily employed has not proven effective under all conditions and the aim of the present invention is to provide a lip tile of improved construction which will more effectively protect the sheet being drawn from heat and gases and in such a manner as to provide for a more accurate control of the temperature of the molten glass.

The type of machine illustrated in the drawings is similar to the machine disclosed in the Colburn patent mentioned above, wherein a sheet of glass 5 is continuously drawn from a mass of molten glass 6 contained in a suitable receptacle or draw pot 7 arranged in open communication with and receiving molten glass from any suitable type of furnace. The sheet is initially drawn in a vertical direction and is subsequently deflected into the horizontal plane about a suitable bending member or roll 8 after which it passes over the drawing and flattening table 9 into a suitable leer, not shown. The drawing and flattening mechanism or table 9 herein shown diagrammatically for the purposes of illustration is preferably arranged within a suitable drawing chamber 10 and the sheet 5 may be held to width by any suitable edge engaging means such as the knurled rollers 11.

The draw pot 7 may be supported upon stools 12 within a heating chamber 13 heated by means of burners or the like 14 and in addition to heating the contents of the pot through the walls thereof, heat is supplied which passes up around the front end of the pot and is deflected downwardly upon the molten glass to assist in maintaining the same in a plastic workable condition.

Arranged above the molten glass 6 at opposite sides of sheet 5 are the cover or lip tiles 15 and 16 which are provided to protect the sheet in its vertical run from heat and gases which would otherwise strike the same, said lip tiles being also adapted to deflect the heat and gases downwardly upon the surface of the molten glass to assist in the proper conditioning thereof. The lip tile 16 is herein shown as being of the usual contruction ordinarily employed in the Colburn machine, the present invention consisting essentially in the novel construction and arrangement of the lip tile 15 which is so designed as to more effectively prevent heat and gases from passing therebeneath and striking against the sheet and to also allow for the removal of excessive heat from adjacent the surface of the molten glass. While the lip tile 16 is shown as being of the usual construction, it will be obvious that a tile similar to the tile 15 may be employed at this side of the sheet if desired to protect the same from heat and gases issuing from the furnace.

Also, if desired, heat absorbing members or coolers 17 and 18 may be provided to cooperate with the lip tiles 15 and 16 in the protection of the sheet from heat currents although such coolers may be dispensed with if preferred so that the invention is not to be restricted to their use.

The improved lip tile 15 is preferably shaped as shown in Fig. 1 to provide a recess or chamber 19 therebeneath suitably closed at its opposite ends by means of blocks or the like. The lip tile is also provided with a plurality of spaced flues or vents 20 extending transversely thereof and being open at their opposite ends. The forward ends of the flues 20 curve downwardly toward the molten glass as indicated at 21 and communicate with the recess 19, said flues entering the recess somewhat above the lower end of the lip 22. The flues 20 extend rearwardly and downwardly and communicate with a compartment 23 arranged beneath the drawing chamber 10 and extending substantially the entire width thereof. Leading from the compartment 23 is a downwardly extending passage 24 controllable by means of a damper plate or the like 25.

In operation, as the heat and gases are conducted up from the pot chamber 13 around the front end of draw pot 7, they are received within the chamber 19 beneath lip tile 15 and are subsequently drawn therefrom in the direction indicated by the arrows upwardly through the flues 20, the heat and gases then passing from the flues into the compartment 23 and thence out through the passage 24 to a stack or the like. By proper regulation of the damper plate 25, the intensity of the draft created within the flues may be effectively regulated in order to more accurately control the removal of the heat and gases from the chamber 19.

By means of the hereinabove described arrangement it will be apparent that it is possible to more effectively control the temperature of the molten glass beneath the lip tile 15 and that the sheet will be effectively protected from the heat and gases contained therebeneath, the said heat and gases being drawn through the flues 20 and in this way prevented from passing beneath the front end of the lip tile toward the sheet. Also, the means herein provided renders possible the positive removal of any excessive heat from beneath the lip tile. Moreover, by means of the present arrangement, the heat being drawn from the chamber 19 may be utilized to heat the drawing chamber 10. In other words, as the heat and gases pass through the compartment 23, a certain amount of heat will be radiated through the floor 26 so as to aid in maintaining the desirable temperature conditions within the drawing chamber 10.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a receptacle containing a mass of molten glass, means for drawing a sheet therefrom, a chamber housing said drawing means, a compartment arranged beneath the drawing chamber, and a lip tile positioned above the molten glass at one side of said sheet and shaped to provide a recess therebeneath, said lip tile being provided with a flue communicating at one end with said recess and at the opposite end with said compartment.

2. In sheet glass apparatus, a receptacle containing a mass of molten glass, means for drawing a sheet upwardly therefrom, a chamber housing said drawing means, a compartment arranged beneath the drawing chamber, and a lip tile positioned above the molten glass at one side of said sheet and shaped to provide a recess therebeneath, said lip tile resting at one end upon the top of said compartment and being provided with a substantially horizontal flue extending transversely therethrough and communicating at one end of said recess and at its other end directly with said compartment.

3. In sheet glass apparatus, a receptacle containing a mass of molten glass, means for drawing a sheet therefrom, and a lip-tile arranged above the molten glass at one side of the sheet, said lip-tile terminating in a downwardly extending lip portion at the end nearest the base of said sheet and said tile being provided with a flue terminating closely adjacent the lip portion and through which heated gases from above the glass are adapted to pass.

4. In sheet glass apparatus, a receptacle containing a mass of molten glass, means for drawing a sheet therefrom, a lip-tile arranged above the molten glass at one side of the sheet, said lip-tile terminating in a downwardly extending lip portion at the end nearest the base of said sheet and said tile being provided with a flue terminating closely adjacent the lip portion and through which heated gases from above the glass are adapted to pass, and means for controlling the amount of gas passing through said flue.

5. In sheet glass apparatus, a receptacle containing a mass of molten glass, means for drawing a sheet therefrom, a lip-tile arranged above the molten glass at one side of the sheet and terminating in a downwardly extending lip at that end closest to the base of said sheet, said lip-tile being provided with a plurality of flues terminating closely adjacent the said lip and adapted to receive heated gases from above the glass, and means for conveying the heated gases away from said tile.

6. In sheet glass apparatus, a receptacle containing a mass of molten glass, means for drawing a sheet therefrom, a lip-tile arranged above the molten glass at one side of the sheet and terminating in a downwardly extending lip at that end closest to the base of said sheet, said lip-tile being provided with a plurality of flues extending substantially horizontally therethrough and terminating at one end closely adjacent the said lip and adapted to receive heated gases from above the glass, and means for conveying the heated gases away from said tile.

7. In sheet glass apparatus, a receptacle containing a mass of molten glass, means for drawing a sheet therefrom, a lip-tile arranged above the molten glass at one side of the sheet and terminating in a downwardly extending lip, said lip-tile being shaped to provide a chamber therebeneath and also being provided with a flue in communication with the end of the chamber nearest the base of the sheet and adapted to receive heated gases from within the chamber.

8. In sheet glass apparatus, a receptacle containing a mass of molten glass, means for drawing a sheet therefrom, a lip-tile arranged above the molten glass at one side of the sheet and terminating in a downwardly extending lip, said lip-tile being shaped to provide a chamber therebeneath and also being provided with a flue in communication with the end of the chamber nearest the base of the sheet and adapted to receive heated gases from within the chamber, and a compartment for withdrawing the heated gases from the lip-tile.

9. In sheet glass apparatus, a receptacle containing a mass of molten glass, means for drawing a sheet therefrom, a lip-tile arranged above the molten glass at one side of the sheet and terminating in a downwardly extending lip, said lip-tile being shaped to provide a chamber therebeneath and also being provided with a flue in communication with the end of the chamber nearest the base of the sheet and adapted to receive heated gases from within the chamber, a compartment for withdrawing the heated gases from the lip-tile, and means for controlling the rapidity with which the heated gases are so withdrawn.

10. In sheet glass apparatus, a receptacle containing a mass of molten glass, means for drawing a sheet therefrom, a lip-tile arranged above the molten glass at one side of the sheet and terminating in a downwardly extending lip, said lip-tile being shaped to provide a chamber therebeneath and also being provided with a plurality of flues in communication with the end of the chamber nearest the base of the sheet and adapted to receive heated gases from within the chamber.

11. In sheet glass apparatus, a receptacle containing a mass of molten glass, means for drawing a sheet therefrom, a lip-tile positioned above the molten glass at one side of the sheet and shaped to provide a recess therebeneath, the end of said tile nearest the base of the sheet terminating in a downwardly extending lip spaced from the end of the receptacle containing the molten glass, means for creating a current of heated gases beneath the receptacle and for directing said gases upwardly of the end of the receptacle and into the recess formed between the tile and the glass thereunder, and a flue formed through the tile and communicating with the recess at the end thereof nearest the sheet being formed for withdrawing the heated gases from said recess.

12. In sheet glass apparatus, a receptacle containing a mass of molten glass, means for drawing a sheet therefrom, a lip-tile positioned above the molten glass at one side of the sheet and shaped to provide a recess therebeneath, the end of said tile nearest the base of the sheet terminating in a downwardly extending lip spaced from the end of the receptacle containing the molten glass, means for creating a current of heated gases beneath the receptacle and for directing said gases upwardly of the end of the receptacle and into the recess formed between the tile and the glass thereunder, a flue formed through the tile and communicating with the recess at the end thereof nearest the sheet being formed for withdrawing the heated gases from said recess, and means for controlling the withdrawal of said gases.

13. In sheet glass apparatus, a receptacle containing a mass of molten glass, means for drawing a sheet therefrom, and a lip-tile arranged above the molten glass at one side of the sheet, said lip-tile terminating in a downwardly extending lip portion and said tile being provided with a flue extending through the lip portion and terminating near the lower edge thereof and through which the heated gases from above the glass are adapted to pass.

14. In sheet glass apparatus, a receptacle containing a mass of molten glass, means for drawing a sheet therefrom, a lip-tile arranged above the molten glass at one side of the sheet, said lip-tile terminating in a downwardly extending lip portion and said tile being provided with a flue extending through the lip portion and terminating near the lower edge thereof and through which the heated gases from above the glass are adapted to pass, and means for controlling the amount of gas passing through said flue.

15. In sheet glass apparatus, a receptacle containing a mass of molten glass, means for drawing a sheet therefrom, a lip-tile arranged above the molten glass at one side of the sheet and terminating in a downwardly extending lip at that end closest to the base of said sheet, the lip portion of said tile being provided with a plurality of flues adapted to receive heated gases from above the glass, and means for conveying the heated gases away from said tile.

16. In sheet glass apparatus, a receptacle containing a mass of molten glass, means for drawing a sheet therefrom, a lip-tile arranged above the molten glass at one side of the sheet and terminating in a downwardly extending lip at that end closest to the base of said sheet, the lip-tile being provided with a plurality of flues extending substantially horizontally therethrough and also through the lip portion and terminating adjacent the bottom of said lips and adapted to receive heated gases from above the glass and for conveying the heated gases away therefrom.

17. In sheet glass apparatus, a receptacle containing a mass of molten glass, means for drawing a sheet therefrom, a lip-tile arranged above the molten glass at one side of the sheet and terminating in a downwardly extending lip at that end closest to the base of said sheet, said lip-tile being shaped to provide a chamber therebeneath and also being provided with a flue in the lip thereof in communication with the end of the chamber nearest the base of the sheet and adapted to receive heated gases from within the chamber and conveying said gases away therefrom.

18. In sheet glass apparatus, a receptacle containing a mass of molten glass, means for drawing a sheet therefrom, a lip-tile arranged above the molten glass at one side of the sheet and terminating in a downwardly extending lip at that end closest to the base of said sheet, said lip-tile being shaped to provide a chamber therebeneath and also being provided with a flue in the lip thereof in communication with the end of the chamber nearest the base of the sheet and adapted to receive heated gases from within the chamber and conveying said gases away therefrom, and means for controlling the rapidity with which the heated gases are so withdrawn.

19. In sheet glass apparatus, a receptacle containing a mass of molten glass, means for drawing a sheet therefrom, a lip-tile positioned above the molten glass at one side of the sheet and shaped to provide a recess therebeneath, the end of the tile nearest the base of the sheet terminating in a downwardly extending lip spaced from the end of the receptacle containing the molten glass, means for creating a current of heated gases beneath the receptacle and for directing said gases upwardly of the end of the receptacle and into the recess formed between the tile and the glass thereunder, and a flue formed through the lip of said tile and communicating with the recess at the end thereof nearest the sheet being formed for withdrawing the heated gases from said recess.

20. In sheet glass apparatus, a receptacle containing a mass of molten glass, means for drawing a sheet therefrom, a lip-tile positioned above the molten glass at one side of the sheet and shaped to provide a recess therebeneath, the end of the tile nearest the base of the sheet terminating in a downwardly extending lip spaced from the end of the receptacle containing the molten glass, means for creating a current of heated gases beneath the receptacle and for directing said gases upwardly of the end of the tile and the glass thereunder, a flue formed through the lip of said tile and communicating with the recess at the end thereof nearest the sheet being formed for withdrawing the heated gases from said recess, and means for controlling the withdrawal of said gases.

Signed at Toledo, in the county of Lucas and State of Ohio, this 24th day of May, 1928.

JOSEPH P. CROWLEY.